United States Patent [19]
Knapp et al.

[11] Patent Number: 5,768,456
[45] Date of Patent: Jun. 16, 1998

[54] OPTOELECTRONIC PACKAGE INCLUDING PHOTONIC DEVICE MOUNTED IN FLEXIBLE SUBSTRATE

[75] Inventors: James H. Knapp, Chandler; Barbara M. Foley, Phoenix, both of Ariz.

[73] Assignee: Motorola, Inc., Schaumburg, Ill.

[21] Appl. No.: 753,311

[22] Filed: Nov. 22, 1996

[51] Int. Cl.$^6$ .................................................... G02B 6/30
[52] U.S. Cl. ................................ 385/49; 385/52; 385/88
[58] Field of Search .............................. 385/39, 49, 50, 385/52, 88–92

[56] References Cited

U.S. PATENT DOCUMENTS

| | | | |
|---|---|---|---|
| 5,249,245 | 9/1993 | Lebby et al. | 385/89 |
| 5,625,734 | 4/1997 | Thomas et al. | 385/88 |

Primary Examiner—John D. Lee
Attorney, Agent, or Firm—Eugene A. Parsons

[57] ABSTRACT

An optoelectronic package including an interconnect substrate having electronic components and carrying an optical fiber holder. The holder containing an end of an optical fiber and including an end surface in which is formed alignment openings. A flexible substrate having conductive traces, a first end, a second end, and alignment openings formed proximate the first end, interconnects the holder and the electronic components of the interconnect substrate. A photonic unit is mechanically and electrically coupled to the flexible substrate proximate the first end in precise relation to the alignment openings so as to be aligned with the optical fiber by inserting alignment pins extending concurrently through the alignment openings of the flexible substrate and the alignment openings of the optical fiber holder.

18 Claims, 4 Drawing Sheets

OPTOELECTRONIC PACKAGE INCLUDING PHOTONIC DEVICE MOUNTED IN FLEXIBLE SUBSTRATE

FIELD OF THE INVENTION

This invention relates, in general, to fabrication of optical devices and, more particularly, to interconnecting optical devices and optical fibers.

BACKGROUND OF THE INVENTION

Presently, coupling of an optical device or array of optical devices, an optical fiber or array of optical fibers, and an interconnect substrate is a difficult task that typically is achieved either manually or semiautomatically. However, these methods have several problems, such as being complex, inefficient, and not suitable for high volume manufacturing. Since these problems limit high volume manufacturing, incorporation of optical devices with standard electronic components is a difficult task, thus not enabling advantages of optical devices to be incorporated with standard electronic components.

By way of example, conventional interconnection of an optical device to an optical fiber is by way of a waveguide. The optical fibers are carried by a connector, such as an MT connector, which is attached to one end of the waveguide with the optical fibers in alignment with the core region of the waveguide. Alignment of the optical device with the optical fibers is achieved by carefully aligning the optical device to the waveguide manually, commonly referred to as active alignment. Once the optical device is appropriately aligned, it is affixed to the waveguide generally by use of an adhesive. Several problems arise by aligning the optical device and the waveguide manually. These problems include being extremely labor intensive, costly, and inaccurate. Further, shifts in the alignment of the optical device to the waveguide often occur during curing of the adhesive used to affix or bind the optical device to the waveguide. The shift in alignment can cause inefficient transfer of light from the optical device. Moreover, if the misalignment is severe enough, unusable product is manufactured, thus increasing cost and reducing manufacturing capability.

Once the optical device and the waveguide have been aligned and interconnected, the optical device and waveguide are then mounted onto a substrate. Mounting the optical device and the waveguide to the substrate also has several problems, such as fragility of the fixed optical device and waveguide, alignment capability of the optical device and waveguide to the substrate, electrical coupling of the optical device, and the like, thus making the interconnection of the optical device, the waveguide, and the interconnect substrate unsuitable for high volume manufacturing.

It can be readily seen that conventional methods for interconnecting an optical device, a waveguide, and an interconnect substrate have severe limitations. Also, it is evident that conventional processes that are used to fabricate the interconnection between optical devices, waveguides, and interconnect substrates are not only complex and expensive, but nonamenable to high volume manufacturing. Therefore, an article for making interconnections between an optical device or array of optical devices, an optical fiber or array of optical fibers, and an interconnect substrate is highly desirable.

SUMMARY OF THE INVENTION

Briefly, to achieve the desired objects of the instant invention in accordance with a preferred embodiment thereof, provided is an optoelectronic mount for interconnecting fiber optics with electronic components including a flexible substrate having electrical traces extending from a first end to a second end. Alignment openings are formed in the flexible substrate proximate the first end. An optical fiber holder contains an end of an optical fiber and includes an end surface in which is formed alignment openings, the optical fiber has an input surface substantially flush with the end surface. A photonic unit including a photonic device, is mechanically and electrically coupled to the flexible substrate proximate the first end in precise relation to the alignment openings. The flexible substrate is coupled to the optical fiber holder by alignment pins extending concurrently through the alignment openings of the flexible substrate and the alignment openings of the optical fiber holder.

BRIEF DESCRIPTION OF THE DRAWINGS

The foregoing and further and more specific objects and advantages of the instant invention will become readily apparent to those skilled in the art from the following detailed descriptions of preferred embodiments thereof taken in conjunction with the drawings, in which.

DESCRIPTION OF THE PREFERRED EMBODIMENTS

Figure 1:
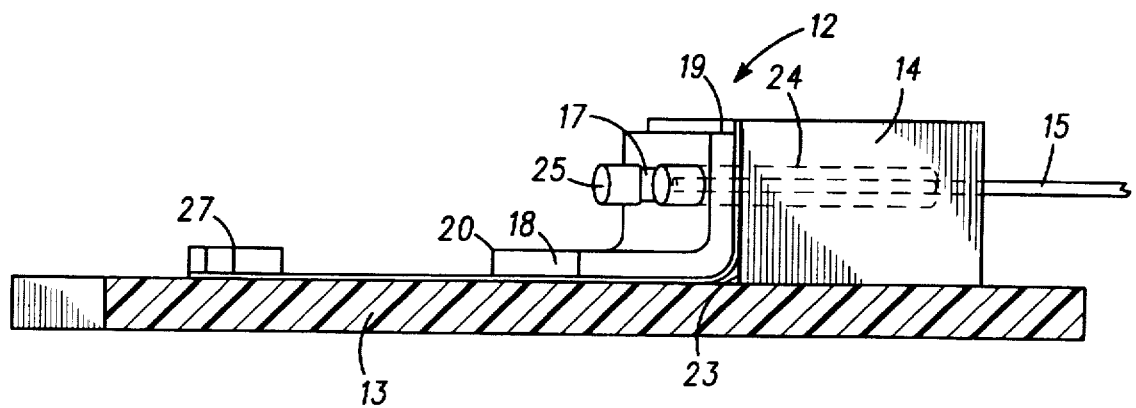
FIG. 1 illustrates a greatly enlarged simplified sectional side view of an optoelectronic mount.
Figure 2:
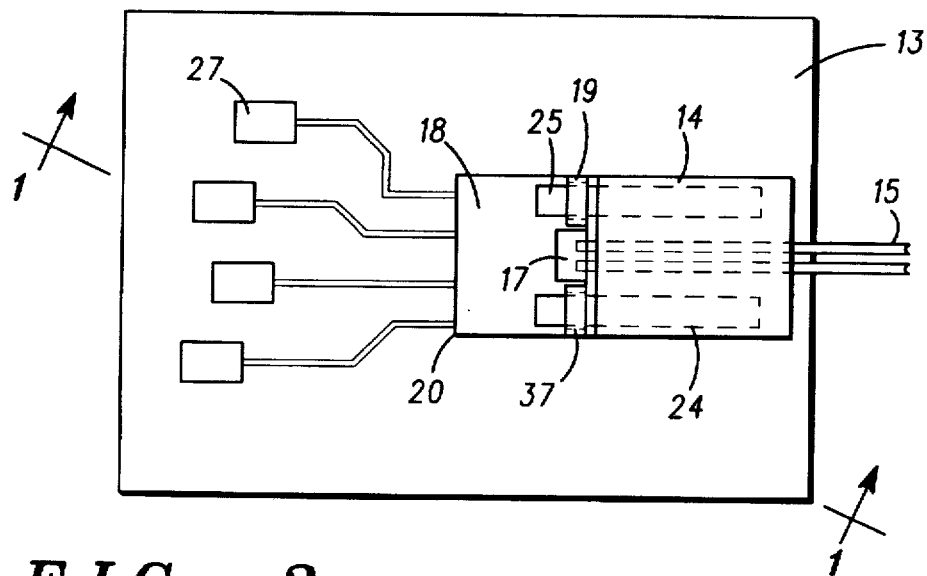
FIG. 2 illustrates a greatly enlarged top plan view of the mount of FIG. 1.

Turning now to the drawings in which like reference characters indicate corresponding elements throughout the several views, attention is first directed to FIGS. 1 and 2 which illustrate a package 10 including an optoelectronic mount 12 affixed to an interconnect substrate 13. Optoelectronic mount 12 includes an optical fiber holder 14 affixed to interconnect substrate 13 and holding optical fibers 15, a photonic unit 17 and an insulative flexible substrate 18 coupling photonic unit 17 to interconnect substrate 13. Flexible substrate 18 has an end 19 to which photonic unit 17 is coupled and an opposing end 20. End 20 is bonded to interconnect substrate 13, while end 19 is coupled to optical fiber holder 14. In this manner, optical devices can be incorporated with standard electrical components.

It will be understood that photonic unit 17 can be any suitable photonic device or array of photonic devices including photo-transmitters, photo-receivers, or a combination thereof. A photo-transmitter can be any suitable device, such as a vertical cavity surface emitting laser (VCSEL), light emitting diode (LED), or the like. Furthermore, any suitable photo-receiving device can be used, such as a photodiode, e.g., P-I-N diode, PN diode, or the like. Thus, photonic unit 17 can be a broad range of photoactive devices capable of transmitting and receiving.

Photonic unit 17 is illustrated as an array spanning the plurality of optical fibers 15 carried by optical fiber carrier 14. Typically, the array can be of any suitable configuration. For example, the array can be made of individual photonic devices that are assembled to form unit 17 or the array can be made an integral unit. Photonic unit 17 is mounted to insulative flexible substrate 18 so that working portions of the photonic devices of unit 17 are aligned to individual optical fibers 15.

Optical fiber holder 14 holds optical fibers 15 in a periodic fashion corresponding to the photonic devices of photonic unit 17. Optical fibers 15 are held such that each input surface 22 (FIG. 3) of each fiber 15 is substantially flush with a front surface 23 of optical fiber holder 14. Alignment holes 24 are formed in front surface 23 on opposing sides of optical fibers 15. Alignment holes 24 are precisely positioned relative optical fibers 15, and receive alignment pins 25 to insure alignment of photonic unit 17 with optical fibers 15, as will be described presently.

Optical fiber holder 14 can be molded as a single piece with the alignment holes and fiber holes formed by precisely aligned hot pins pushed through the piece. The fibers are then threaded through the holes, glued and polished at input surface 22. Another method of forming optical fiber holder 14 is to mold two halves, and glue the halves around fibers 15. The ends are then polished.

Interconnect substrate 13 is any suitable substrate, such as a printed circuit board, a FR4 board, a ceramic interconnect board, or the like, carrying electronic components. For example, interconnect substrate 13 may be a printed circuit board having a plurality of integrated circuit (IC) chips 27 to drive the photonic devices of photonic unit 17. IC chips 27 are coupled to photonic unit 17 by flexible substrate 18.

Figure 3:
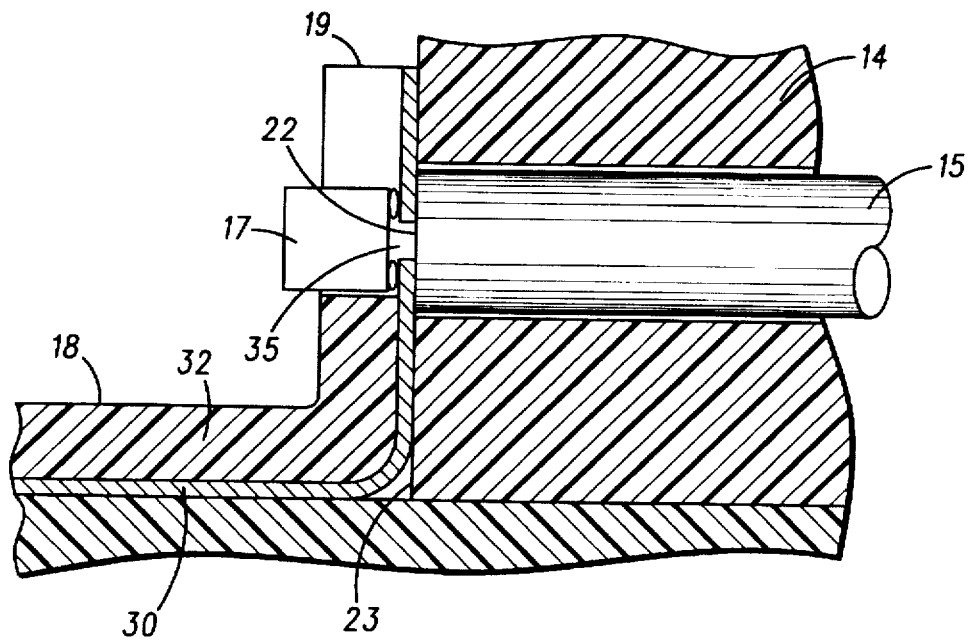
FIG. 3 illustrates a greatly enlarged sectional side view of a portion of the mount of FIGS. 1 and 2.

With additional reference to FIG. 3, flexible substrate 18 is preferably a tape automated bonding (TAB) tape include several elements or features, such as bonding pads, thermally conductive traces and electrical traces. Only metallic electrical traces 30 and flexible insulation 32 are shown, as each of the other elements are well known and are not needed for the description of the present invention other than to know they are present for electrical coupling to substrate 13 and IC chips 27 for example.

Adhesion of electrical traces 30 to flexible insulation 32 is such that they will not delaminate or separate when insulative flexible substrate 18 is bent or positioned on optical fiber holder 14 or interconnect substrate 13. Additionally, materials selected for fabrication of insulative flexible substrate 18 are generally temperature resistant. For example, in most applications, optoelectronic mount 10 will undergo an overmolding process. Temperatures and times of duration of the overmolding process typically range from 200–300 degrees Celsius with time ranges from 10–15 minutes. Thus, material selected for fabrication of insulative flexible substrate 18 need to be tolerant of these temperatures and times. However, it should be evident that materials that exceed these requirements or performance levels, are also usable.

Still referring to FIG. 3, a portion of flexible insulation 32 proximate end 19 is removed leaving the bare metal of electrical traces 30. Photonic unit 17 is coupled directly to electrical traces 30 which provide signals from IC chips 27 controlling the operation thereof. Additionally, a window 35 is formed through electrical traces 30, thereby allowing light to pass between optical fibers 15 and photonic unit 17. Alignment openings 37 are formed in insulative flexible substrate 18 on opposing sides of window 35. Alignment holes 37 are precisely positioned relative to the photonic unit 17, which is precisely mounted on the flexible substrate.

Accurate placement or alignment of insulative flexible substrate 18, and therefore photonic unit 17, to optical fiber holder 14 is achieved by the use of alignment pins 25. As shown in FIGS. 1 and 2, pins 25 extend concurrently through openings 37 formed proximate end 19 of flexible substrate 18, and openings 24 formed in optical fiber holder 14, thereby aligning insulative flexible substrate 18 and photonic unit 17 to optical fiber holder 14. Attachment of insulative flexible substrate 18 to optical fiber holder 14 is achieved by any suitable method or technique, such as an adhesive, e.g., epoxy, polyimide, or any ultraviolet curable adhesive, or the like. Insulative flexible substrate 18 is positioned by alignment pins 25 and affixed to optical fiber holder 14 by use of an adhesive. For example, an optically transparent epoxy is applied to surface 23 of optical fiber holder 14. Insulative flexible substrate 18 is subsequently applied to optical fiber holder 14 and aligned using pins 25.

Figure 4:
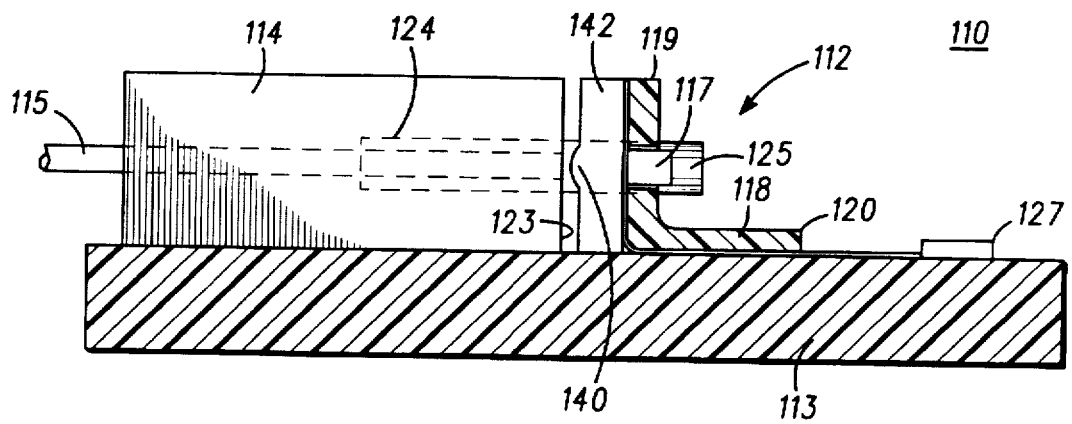
FIG. 4 illustrates a greatly enlarged simplified sectional view of the optoelectronic mount of FIGS. 1-3, with the addition of an HOE.
Figure 5:
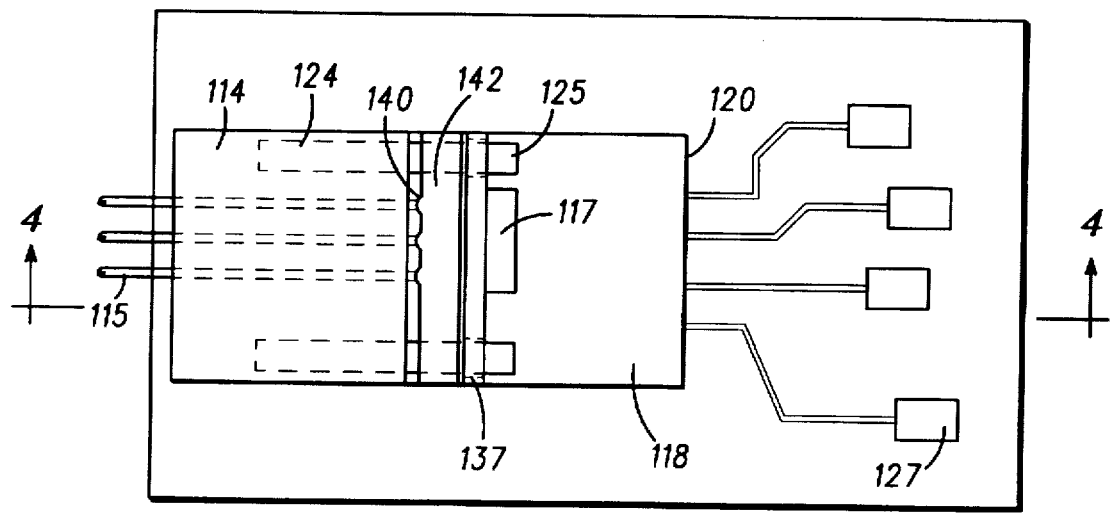
FIG. 5 illustrates a greatly enlarged top plan view of the mount of FIG. 4.

Turning now to FIGS. 4 and 5, another embodiment of a package generally designated 110 is illustrated. Package 110 is similar to package 10 described above, and includes an optoelectronic mount 112 affixed to an interconnect substrate 113. Optoelectronic mount 112 includes an optical fiber holder 114 affixed to interconnect substrate 113 and holding optical fibers 115, a photonic unit 117 and an insulative flexible substrate 118 coupling photonic unit 117 to interconnect substrate 113. Flexible substrate 118 has an end 119 proximate to which photonic unit 117 is coupled and an opposing end 120. End 120 is bonded to interconnect substrate 113, while end 119 is coupled to optical fiber holder 114.

As with the previous embodiment, alignment holes 124 are formed in a front surface 123 of optical fiber holder 114, on opposing sides of optical fibers 115, and alignment holes 137 are formed through insulative flexible substrate 118 proximate end 119. Alignment holes 124 and 137 are precisely positioned relative optical fibers 115 and photonic unit 117 respectively, and receive alignment pins 125 to insure alignment of photonic unit 117 with optical fibers 115. Interconnect substrate 113 includes electronics elements, such as IC chips 127 to run the photonic devices of photonic unit 117. IC chips 127 are coupled to photonic unit 117 by flexible substrate 118.

Package 110 differs from package 10 in that an optical element 140 is positioned intermediate optical fiber holder 114 and insulative flexible substrate 118 to shape the beam received from or transmitted to the optical fibers. In many applications, large core fibers are used. This is prevalent when plastic optical fibers are used in place of glass optical fibers. Generally, plastic fibers have a larger core diameter. By diverging the beam the light coupled between a light emitting device, such as a light emitting diode or a laser, and an optical fiber is improved. This is particularly important in order to couple a beam from a vertical cavity surface emitting laser (VCSEL) into a multimode optical fiber, with the modes of the fiber all being excited at the input end. By converging or focusing a beam, loss of light at a photo receiver can be reduced when large core fibers are used. Focusing and divergence can be achieved by employing a diffractive optical element.

Optical element 140 is preferably etched into a glass or plastic base 142 and positioned directly between photonic unit 17 and optical fiber 15. In the instance of an array of photonic devices included in photonic unit 117, a plurality of optical elements 140 are etched in base 142 with each optical element 140 positioned to align directly between a photonic device and its associated optical fiber. To properly align optical elements 140 between optical fibers 115 and photonic unit 117, alignment holes 144 are formed through base 142 on opposing sides of optical elements 140. Alignment openings 144 are precisely positioned relative to optical elements 140.

Accurate placement or alignment of insulative flexible substrate 118, and therefore photonic unit 117, base 142, and therefore optical element 140 and optical fiber holder 114 is achieved by the use of alignment pins 125. As shown in FIGS. 4 and 5, base 142 is positioned intermediate optical fiber holder 114 and insulative flexible substrate 118. Alignment pins 125 are inserted concurrently through openings 137 formed proximate end 119 of flexible substrate 118, openings 144 formed in base 142, and openings 124 formed in optical fiber holder 114, thereby aligning insulative flexible substrate 118 and photonic unit 117 to optical fiber holder 114, with optical elements 140 formed in base 142 positioned therebetween.

Figure 6:
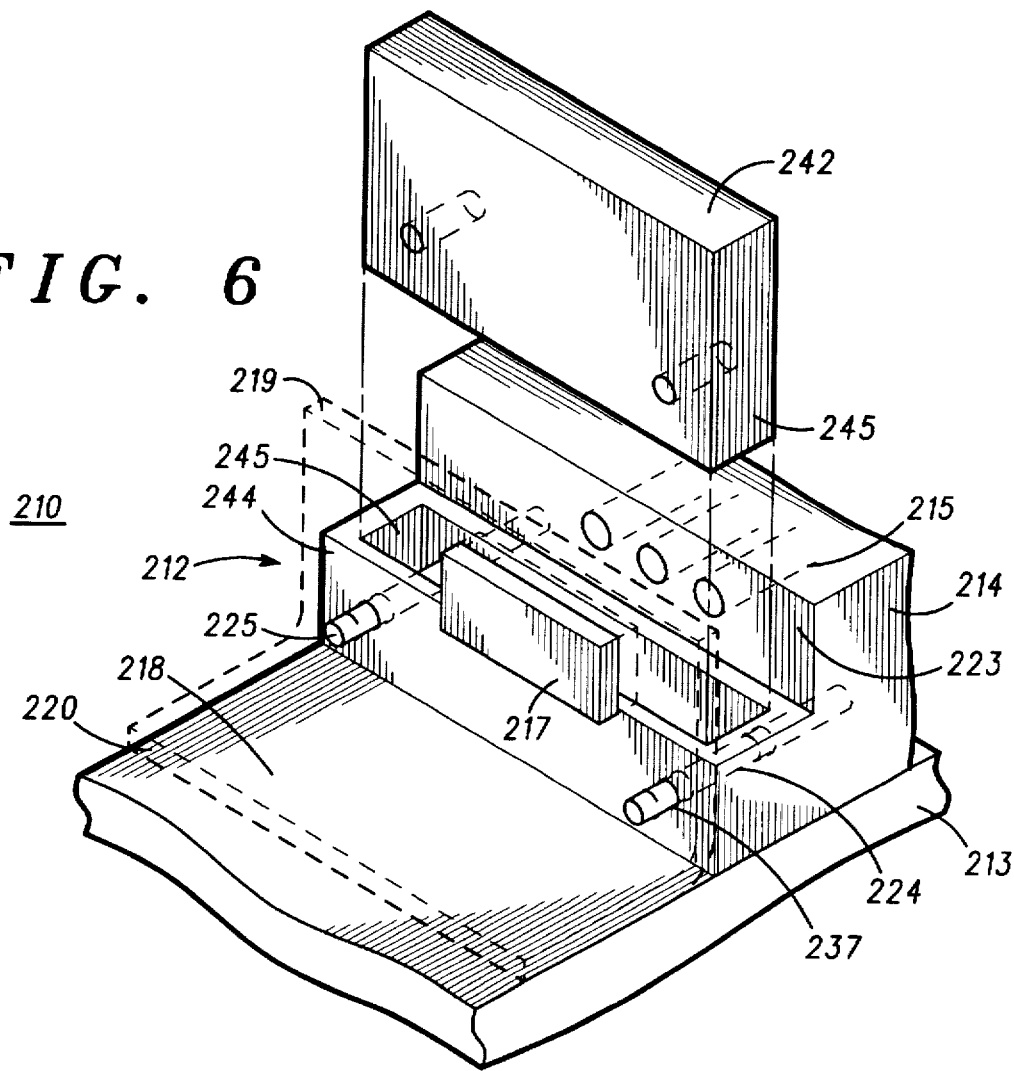
FIG. 6 illustrates a greatly enlarged simplified perspective view of a further embodiment of a optoelectronic mount.
Figure 7:
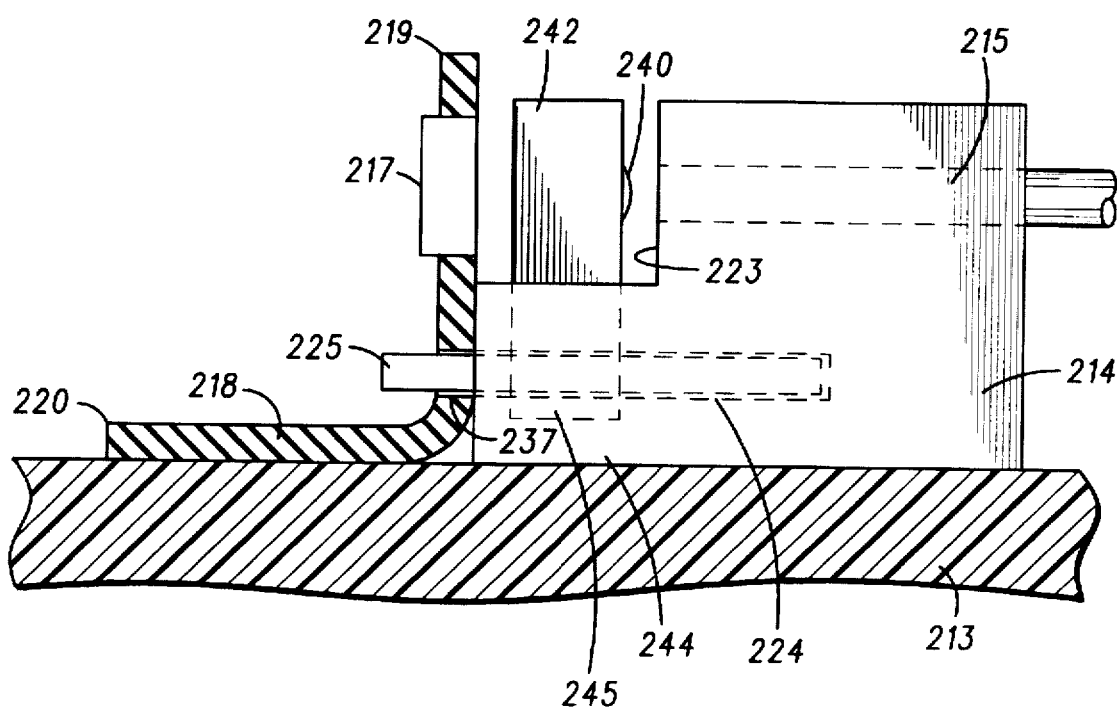
FIG. 7 illustrates a greatly enlarged simplified sectional side view of the optoelectronic mount of FIG. 6.

Turning now to FIGS. 6 and 7, yet another embodiment of a package generally designated 210 is illustrated. Package 210 is similar to package 110 described above, and includes an optoelectronic mount 212 affixed to an interconnect substrate 213. Optoelectronic mount 212 includes an optical fiber holder 214 affixed to interconnect substrate 213 and holding optical fibers 215, a photonic unit 217 and an insulative flexible substrate 218 coupling photonic unit 217 to interconnect substrate 213. Flexible substrate 218 has an end 219 proximate to which photonic unit 217 is coupled and an opposing end 220. End 220 is bonded to interconnect substrate 213, while end 219 is coupled to optical fiber holder 214.

As with the previous embodiments, alignment holes 224 are formed in a front surface 223 of optical fiber holder 214, on opposing sides of optical fibers 215, and alignment holes 237 are formed through insulative flexible substrate 218 proximate end 219. Alignment holes 224 and 237 are precisely positioned relative optical fibers 215 and photonic unit 217 respectively, and receive alignment pins 225 to insure alignment of photonic unit 217 with optical fibers 215.

Package 210 differs from package 110 in that an optical element 240 formed in a base 242 is positioned in a receptacle 244 formed in optical fiber holder 214 and extending from front surface 223. Receptacle 244 defines a precisely positioned slot 245 dimensioned to receive and position base 242 intermediate optical fibers 215 and insulative flexible substrate 218. Optical element 240 is generally identical to optical element 140 described previously, but is aligned by employing slot 245 of receptacle 244 instead of alignment openings. Alignment openings 224 extend through receptacle 244 on opposing sides of slot 245.

Accurate placement or alignment of insulative flexible substrate 218 and therefore photonic unit 217, base 242 and therefore optical element 240, and optical fiber holder 214 is achieved by the use of alignment pins 225 and slot 245. As shown in FIGS. 6 and 7, base 142 is positioned intermediate optical fiber holder 114 and insulative flexible substrate 118 within slot 245. Slot 245 positions base 242 with optical elements 240 in alignment with optical fibers 215. Alignment pins 225 are inserted concurrently through openings 237 formed proximate end 219 of flexible substrate 218, and openings 224 formed in optical fiber holder 214, thereby aligning insulative flexible substrate 218 and photonic unit 217 to optical fiber holder 214, with optical elements 240 formed in base 242 positioned therebetween. By employing slot 245 to position optical element 140, an air gap can be created between optical element 140 and optical fibers 215.

By now it should be appreciated that a novel optoelectronic mount has been provided. The optoelectronic mount enables the incorporation of standard electronic components and optical components such that advantages of the optical components can be utilized. While the present disclosure illustrates a single optoelectronic mount, it will be understood by those skilled in the art that the unit may be used in either or both of an optical transmitter and an optical receiver. Further it should be noted that the method and apparatus of the present invention allow this integration in a cost effective manner by providing a way of eliminating costly steps carried out by hand and to automate the remaining manufacturing steps thus making the entire process highly manufacturable.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. An optoelectronic mount for interconnecting fiber optics with electronic components comprising:

a flexible substrate including a layer of flexible insulation and electrical traces positioned in the layer of flexible insulation and extending from a first end to a second end, a mounting opening in the layer of flexible insulation exposing portions of the electrical traces adjacent the first end, and alignment openings formed in the flexible substrate proximate the first end and in precise relation to the mounting opening;

an optical fiber holder containing an end of an optical fiber and including an end surface in which is formed alignment openings, the optical fiber including an input surface substantially flush with the end surface;

a photonic unit including a photonic device, mechanically fixed in the layer of flexible insulation and electrically coupled to the electrical traces of the flexible substrate in the mounting opening proximate the first end in precise relation to the alignment openings in the flexible substrate; and alignment pins extending concurrently through the alignment openings of the flexible substrate and the alignment openings of the optical fiber holder.

2. An optoelectronic mount as claimed in claim 1 wherein the a flexible substrate further includes a window with which the photonic device is aligned.

3. An optoelectronic mount as claimed in claim 2 wherein the photonic unit includes an array of photonic devices and the optical fiber holder contains a plurality of optical fibers, each corresponding to one of the array of photonic devices.

4. An optoelectronic mount as claimed in claim 3 further including a base having a plurality of optical elements formed therein, positioned between the optical fiber holder and the photonic unit such that each optical element is aligned with a corresponding one of the plurality of optical fibers and photonic devices.

5. An optoelectronic mount as claimed in claim 4 wherein the base includes alignment openings formed therethrough for receiving said alignment pins.

6. An optoelectronic mount as claimed in claim 4 wherein the optical fiber holder includes a receptacle extending from the end surface and defining a slot in which is carried the base such that each optical element is aligned with the corresponding optical fiber.

7. An optoelectronic mount as claimed in claim 2 further including an optical element positioned between the optical fiber holder and the photonic unit, and aligned with the optical fiber and the photonic device.

8. An optoelectronic mount as claimed in claim 7 wherein the optical element includes alignment openings formed therethrough for receiving said alignment pins.

9. An optoelectronic mount as claimed in claim 7 wherein the optical fiber holder includes a receptacle extending from the end surface and defining a slot in which is carried the optical element, aligned with the optical fiber.

10. An optoelectronic package comprising:

an interconnect substrate having electronic components;

an optical fiber holder carried by the interconnect substrate, the optical fiber holder containing an end of an optical fiber and including an end surface in which is formed alignment openings, and;

a flexible substrate having a layer of flexible insulation, conductive traces formed in the layer of flexible insulation, a first end, a second end, a mounting opening in the layer of flexible insulation exposing portions of the electrical traces adjacent the first end, and alignment openings formed proximate the first end, the flexible substrate interconnecting the optical fiber holder and the electronic components of the interconnect substrate;

a photonic unit including a photonic device, mechanically fixed in the layer of flexible insulation and electrically coupled to the electrical traces of the flexible substrate in the mounting opening proximate the first end in precise relation to the alignment openings in the flexible substrate; and alignment pins extending concurrently through the alignment openings of the flexible substrate and the alignment openings of the optical fiber holder.

11. An optoelectronic package as claimed in claim 10 wherein the a flexible substrate further includes a window with which the photonic unit is aligned.

12. An optoelectronic package as claimed in claim 11 wherein the photonic unit includes an array of photonic devices and the optical fiber holder contains a plurality of optical fibers, each corresponding to one of the array of photonic devices.

13. An optoelectronic package as claimed in claim 12 further including a base having a plurality of optical elements formed therein, positioned between the optical fiber holder and the photonic unit such that each optical element is aligned with a corresponding one of the plurality of optical fibers and photonic devices.

14. An optoelectronic package as claimed in claim 13 wherein the base includes alignment openings formed therethrough for receiving said alignment pins.

15. An optoelectronic package as claimed in claim 13 wherein the optical fiber holder includes a receptacle extending from the end surface and defining a slot in which is carried the base such that each optical element is aligned with the corresponding optical fiber.

16. An optoelectronic package as claimed in claim 11 further including an optical element positioned between the optical fiber holder and the photonic unit, and aligned with the optical fiber and the photonic device.

17. An optoelectronic package as claimed in claim 16 wherein the optical element includes alignment openings formed therethrough for receiving said alignment pins.

18. An optoelectronic package as claimed in claim 10 wherein the optical fiber holder includes a receptacle extending from the end surface and defining a slot in which is carried the optical element, aligned with the optical fiber.

* * * * *

UNITED STATES PATENT AND TRADEMARK OFFICE
CERTIFICATE OF CORRECTION

PATENT NO. : 5,768,456

DATED : June 16, 1998

INVENTOR(S) : Knapp et al.

It is certified that error appears in the above-identified patent and that said Letters Patent is hereby corrected as shown below:

In column 8, claim 18, line 33, delete –10— and insert "16".

Signed and Sealed this

Thirteenth Day of April, 1999

Attest:

Q. TODD DICKINSON

*Attesting Officer*　　　*Acting Commissioner of Patents and Trademarks*